March 30, 1971  R. W. CHIDGEY ET AL  3,573,142

MOLDED THERMOPLASTIC ARTIFICIAL SOD HAVING A FABRIC BACKING

Filed Sept. 17, 1968

INVENTORS
RONALD W. CHIDGEY
JACK DOLEMAN

United States Patent Office 3,573,142
Patented Mar. 30, 1971

3,573,142
MOLDED THERMOPLASTIC ARTIFICIAL SOD HAVING A FABRIC BACKING
Ronald W. Chidgey, Pensacola, and Jack Doleman, Gulf Breeze, Fla., assignors to Monsanto Company, St. Louis, Mo.
Filed Sept. 17, 1968, Ser. No. 760,222
Int. Cl. A41g 1/00
U.S. Cl. 161—21
10 Claims

ABSTRACT OF THE DISCLOSURE

Molded, thermoplastic, three-dimensional synthetic sod is provided which comprises a matrix having openings, projections extending from the matrix to simulate blades of grass and a bonded backing on the under side of the matrix. The backing is composed of a synthetic fibrous, porous fabric which serves to prevent weed growth and erosion and yet is porous which allows seepage of water through the sod. The fabric also allows bonding of the material to substrates, such as asphalt. In an additional feature, a foam material, such as polyurethane foam may be bonded to the bottom of the fabric when it is desirable that the product be of the non-slip type such as doormats, etc.

BACKGROUND OF THE INVENTION

Molded, synthetic sod or grass has recently found some acceptance for use in place of natural grass in areas where grass is difficult to grow or maintain. In the copending application of Doleman and Hills, S.N. 650,986, filed July 3, 1967 now U.S. Patent 3,507,010, there is disclosed and claimed a type of synthetic sod which is a continuously molded thermoplastic material comprising a matrix having projections therefrom. The matrix also contains openings for drainage, etc. French Patent No. 1,314,933 discloses another but similar type of molded grass product which is produced in squares or blocks with means for connecting one to the other. U.S. Patent 3,157,557 discloses yet another type of molded grass product made of synthetic thermoplastic material.

While synthetic, thermoplastic, molded grass products are relatively inexpensive and do have a certain aesthetic appeal difficulties have been encountered in their use. Since these synthetic grass products are made of thermoplastic materials, e.g. polyolefins, they possess the disadvantage of being difficult to bond to a base with conventional glues. A further disadvantage when these products are used as a lawn surface is the tendency for weeds to grow through the holes in the matrix or base and/or for erosion to occur by water washing through the holes.

SUMMARY OF THE INVENTION

In accordance with this invention these disadvantages are overcome by providing a three-dimensional, molded, grass-like product comprising a relatively flat thermoplastic matrix having projections extending therefrom and integral therewith. The projections are shaped to simulate natural grass and the matrix is provided with openings over its surface area. On the bottom side of the matrix, in accordance with this invention, there is provided a synthetic, porous, fibrous fabric which is bonded thereto.

The matrix and projections thereon are molded, as an integral unit, from a thermoplastic material. Because of its availability and performance qualities, polethylene is preferred but other materials such as polypropylene, nylon, polyesters and like thermoplastic materials may be employed. Thermoplastic copolymers or blends are also satisfactory. The integrally molded matrix and projections may be produced by a batch process, i.e., one sheet at a time, or by a continuous process as described in said copending S.N. 650,986 filed July 3, 1967. Obviously, for economic reasons a continuous process is preferred. Regardless of how the integrally molded material is made it is necessary that the matrix be provided with openings for water drainage. In a batch, or piece-molding process this is accomplished by the usual method of shaping the mold so as to provide holes in the base or matrix. In the continuous process for molding three-dimensional materials described in said S.N. 650,986, openings in the matrix occur as a natural result of the process. In that process, the projections occur in clusters which clusters are connected by parallel strips of thermoplastic material. Since the clusters do not abut each other, the openings occur between the clusters. The projections which extend from the matrix are essentially vertical after being molded. In order to impart the appearance of natural grass it is necessary to texture the molded material to disperse the tips of the projections randomly, much in the manner of natural grass. This may be conveniently done by applying a heated pressure roll to the top of the molded material, i.e., the side from which the projections extend. If the thermoplastic material is hot enough, e.g., if it retains heat from the molding operation, the pressure roll need not be heated. This texturing imparts a permanent crimp in the projections whereby they remain flattened down with the tips dispersed randomly over the surface.

The important feature of this invention is the provision of a backing on the integrally molded material which serves to overcome the disadvantages mentioned above. In accordance with this invention the backing material is a synthetic porous, fibrous fabric. Since the products of this invention find application in out-of-doors uses, it is important that the backing material be as stable as possible against weathering. For this reason the backing must be made from synthetic, i.e. man-made polymeric, material. Suitable materials for this purpose are polyolefins, such as polypropylene; nylon, polyester, and other like synthetic fiber-forming materials. The synthetic fibrous material is bonded to the under side of the molded thermoplastic in the form of a fabric which may be woven but preferably is a non-woven fabric. The fabric backing must be porous to allow drainage of water and yet must be strong enough to provide a substantial bond to the molded thermoplastic. Non-woven fabrics have been found to be particularly suitable for this purpose.

The synthetic fabric is preferably bonded to the molded thermoplastic matrix by heating the thermoplastic followed by contacting the heated portion of the matrix with the synthetic fabric and applying sufficient pressure, such as, for example, squeeze rolls, to embed the fabric into the molded article. Heat bonding is preferred since it does not introduce any foreign materials and also, does not appreciably affect the strength of either the molded thermoplastic or the fabric. If desired, however, other methods of bonding may be employed, e.g., solvent bonding or adhesives, when the product is to be used for those specific purposes in which the disadvantages are not objectionable.

As an additional feature of this invention, a thin synthetic, cellular foam may be bonded to the underside of the synthetic fabric. When the synthetic sod of this invention is to be used for a purpose in which slipping of the sod is undesirable, e.g., as a door mat, the use of the foam as an additional backing has been found to prevent slipping. Any synthetic foam material may be used for this purpose. Polyurethane foam has been found particularly suitable but other foams, such as polyvinyl chloride foams, and the like may be used. The foam may be applied to the fabric with an adhesive or any other suitable bonding means. It should be relatively thin since this is all that is required for the non-skid characteristic.

PREFERRED EMBODIMENTS

Example I

Figure 1:
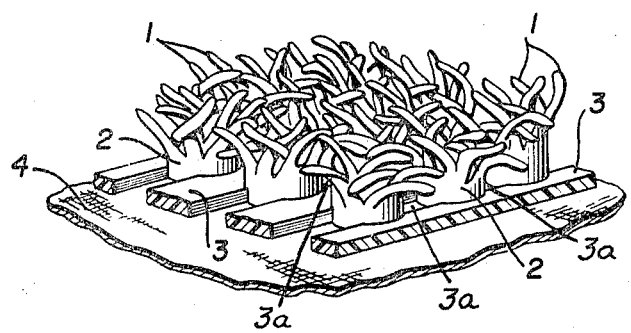
FIG. 1 shows an illustrative cut-away view of the product of this invention. As shown therein, the molded product comprises thermoplastic blades, 1, which are preferably crimped, or bent, to simulate natural grass. Preferably, the blades are in clusters having a base 2. The blade clusters form an integral part of the synthetic sod and are arranged between parallel strips, 3, composed of the same thermoplastic material, and separated by openings 3a. The thermoplastic matrix has a backing, 4, bonded thereto which is synthetic, porous fibrous material.

This example illustrates a preferred method of producing synthetic molded sod with a non-woven fabric bonded to its lower surface by means of a continuous process. The apparatus used to mold the synthetic grass of this example is fully described in U.S. patent application 650,986, filed July 3, 1967 now U.S. Pat. 3,507,010, and is shown in FIGS. 1, 15 and 16 of said application.

Using a blend of 100 parts by weight of polyethylene, Melt Index 22, and 4 parts (wt.) of green pigmented polyethylene (90% polyethylene, 10% green pigment) a continuous length of 36" wide synthetic sod with bonded, non-woven polyester fabric was produced.

The molten polymer was forced through a distribution nozzle onto a rotating mold drum with a 4½" diameter screw extruder. Melt temperature measured at the extruder exit was 425° F., nozzle temperature was 350° F. mold drum temperature was 125° F. Extrusion pressure was about 1350 p.s.i. at the end of the extruder barrel. At the deepest part of the mold cavity, which was at 40 oz./yd.²) is fed to the flat surface of the molded syntrance of the mold cavity pressure was about 50 p.s.i. The total force holding the rotating drum in contact with the nozzle was about 9000 lbs. Peripheral speed of the drum was about 4 f.p.m. Before the molded product is cooled, a 36" width of non-woven polyester of low weight (1–2 oz./yd.²) is fed to the flat surface of the molded synthetic sod from a supply roll above the apparatus. The linear feed rate of the fabric is about equal to the peripheral speed of the drum and is controlled by drum speed. While the fabric is fed from the roll it is held under tension by a tension gate; it then travels under a pressure roll which imbeds the fabric into the curvi-linear surface of the molded grass. The tension on the fabric is sufficient to give a stretch to the fabric of 1% which is the amount by which the thermoplastic material shrinks upon cooling. In this way the product will lay flat without curling or buckling when being used at ambient temperatures. The pressure roll is held against the surface of the product by a force of about 600 lbs. at the point of contact. Simultaneously external heat is applied to the molded product before it makes contact with the fabric. This is done to maintain the polymer surface in a molten state and thereby allow polymer to flow into the interstices of the nonwoven fabric and affect a perfect bond between fabric and molded product. The external heat that is supplied to the polymer immediately following injection molding is preferably radiant heat. In this example, one 2,000 watt infra-red lamp, placed about 1 to 2 inches above the mold drum, is sufficient to maintain the polymer surface in a molten state satisfactory for fabric bonding. During processing the synthetic grass product is cooled by feeding water at about 70° F. to the interior of the drum at a rate of about 35 gals./min. As the molded grass is cooled to about 175° F., it is stripped from the drum and textured by passing it under a pair of heated metal rolls and wound on a mandrel to form large rolls of synthetic grass suitable for future handling and storage. The product of this example has the form depicted in FIG. 1 and has broad use as an outdoor artificial grass capable of preventing the growth of weeds on the ground beneath it and allowing water drainage such that the result is an aesthetically pleasing grass-like area requiring none of the maintenance of natural turf.

Example II

This example illustrates a method whereby synthetic molded sod can be manufactured with a non-skid material bonded to its lower surface.

When it is desired to produce a synthetic molded grasslike product having a non-skid surface, another material is first adhered to the non-woven fabric. Subsequent steps and processing conditions in molding the thermoplastic product and in bonding the fabric are the same as those in Example I.

Figure 2:
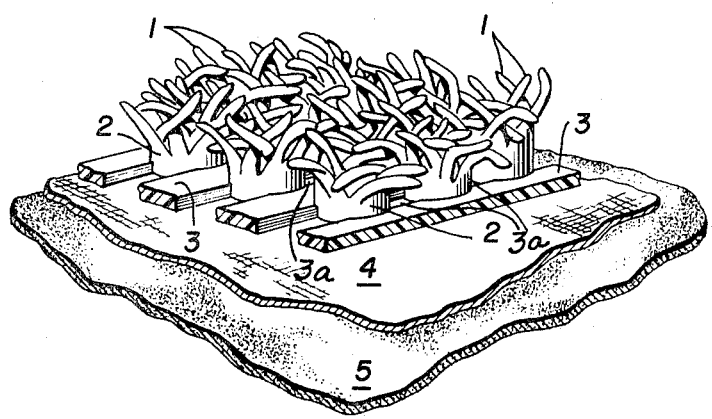
FIG. 2 is a view of an additional embodiment of this invention and shows a foam material, 5, bonded to the underside of the porous fabric.

As an illustration, a ⅛ inch thick polyurethane foam sheet was flame-laminated to a polyester non-woven fabric using conventional methods. Foam sheet width and fabric width were about 36 inches. The laminated pad is then rolled onto a spool for use as the fabric supply roll in bonding molded grass by a continuous process. The laminated fabric is then directed onto the molten surface of the molded product with the polyester fabric face toward the molded product and is bonded in the same manner as described in the preceding example. The resulting product is depicted in FIG. 2 and can be made into rectangles, or other shapes, for use as door mats or non-skid carpets in play areas and the like.

What is claimed is:
1. A three-dimensional, molded product comprising
    (a) a thermoplastic matrix having projections extending therefrom on the upper side thereof, said projections being integral therewith and being shaped to simulate natural grass, said matrix having openings dispersed over its surface area; and
    (b) a synthetic, porous, fibrous fabric bonded to the under side of said matrix.
2. The product of claim 1 wherein the fabric is heat bonded to the matrix.
3. The product of claim 1 wherein the thermoplastic material is a polyolefin.
4. The product of claim 3 wherein the polyolefin is polyethylene.
5. The product of claim 3 wherein the fibrous fabric comprises a polyester.
6. The product of claim 3 wherein the fibrous fabric comprises nylon.
7. The product of claim 1 wherein the projections are in the form of clusters.
8. The product of claim 7 wherein the clusters are connected by parallel strips of thermoplastic material spaced between the clusters and integral thereto.
9. The product of claim 1 comprising additionally a thin synthetic foam bonded to the under side of the fabric.
10. The product of claim 3 comprising additionally a thin synthetic foam bonded to the under side of the fabric.

References Cited

UNITED STATES PATENTS

| | | | |
|---|---|---|---|
| 3,157,557 | 11/1964 | Palmer | 161—67X |
| 3,390,044 | 6/1968 | Malakoff | 161—62X |
| 2,515,847 | 7/1950 | Winkler | 161—112X |

PHILIP DIER, Primary Examiner

U.S. Cl. X.R.

161—27, 67, 113, 159; 139—402